United States Patent [19]

Nawata et al.

[11] Patent Number: 5,355,932
[45] Date of Patent: Oct. 18, 1994

[54] METHOD OF PRODUCING A COMPOUND ROLL

[75] Inventors: Ryosaku Nawata; Kenji Date; Toshiyuki Hattori, all of Kitakyusyu, Japan

[73] Assignee: Hitachi Metals, Ltd., Tokyo, Japan

[21] Appl. No.: 25,669

[22] Filed: Mar. 3, 1993

[30] Foreign Application Priority Data

Mar. 6, 1992 [JP] Japan .................................. 4-084707

[51] Int. Cl.$^5$ ..................... B22D 13/02; B22D 19/16
[52] U.S. Cl. .................................. 164/95; 164/114; 164/115
[58] Field of Search .................. 164/114, 115, 94, 95, 164/96

[56] References Cited

U.S. PATENT DOCUMENTS 3,894,325 7/1975 Maruta et al. .................... 164/95 X

FOREIGN PATENT DOCUMENTS

| 0430241 | 6/1991 | European Pat. Off. . |
| 0464780 | 1/1992 | European Pat. Off. . |
| 50-33021 | 10/1975 | Japan . |
| 54-35170 | 10/1979 | Japan .................... 164/114 |
| 55-158874 | 12/1980 | Japan .................... 164/95 |
| 57-58969 | 4/1982 | Japan .................... 164/95 |
| 58-110166 | 6/1983 | Japan . |
| 60-124407 | 7/1985 | Japan . |
| 63-207468 | 8/1988 | Japan .................... 164/95 |
| 1-254363 | 10/1989 | Japan . |

*Primary Examiner*—J. Reed Batten, Jr.
*Attorney, Agent, or Firm*—Sughrue, Mion, Zinn, Macpeak & Seas

[57] ABSTRACT

The compound roll having a shell portion made of a hard, high-alloy cast steel or iron having excellent wear resistance and resistance to surface roughening and a core portion made of a tough cast iron or cast steel, the cast iron of the shell portion having a composition consisting essentially, by weight ratio, of 1.0–3.0% of C, 2.0% or less of Si, 2.0% or less of Mn, 2.0–15.0% of Cr, 10.0% or less of Mo, 2.0–8.0% of V, the balance being substantially Fe and inevitable impurities, an average diameter of crystal grains constituting a matrix of the metal structure of the shell portion being 100 μm or less in a range from a surface to a depth of 50 mm when determined by an image analysis method on the crystal grains having diameters exceeding 30 μm, and the crystal grains satisfying the formula: $m_2 \leq 1.2\, m_1$, wherein $m_1$ is an average diameter of the crystal grains at the surface of the shell portion, and $m_2$ is an average diameter of the crystal grains at the depth of 50 mm, is produced by a centrifugal casting method which comprises supplying a melt for the shell portion at a temperature T satisfying the formula: $Tc \leq T \leq Tc + 90°$ C., wherein Tc is a primary crystal-forming temperature of the melt for the shell portion, to a hollow cylindrical mold rotatable around its longitudinal axis, at such a speed that an average shell portion-forming speed in the mold is 2–40 mm/min.

10 Claims, 3 Drawing Sheets

OUTER SURFACE INNER SURFACE

500 μm

500 μm

500 μm

500 μm

METHOD OF PRODUCING A COMPOUND ROLL

BACKGROUND OF THE INVENTION

The present invention relates to a compound roll comprising a shell portion having excellent wear resistance and resistance to surface roughening and a tough core portion, and a method of producing such a compound roll by a centrifugal casting method, particularly to a compound roll having a shell portion having a fine and uniform metal structure and a method of producing such a compound roll.

In a roll used for hot rolling or cold rolling of steel materials, it is required that a shell portion, which is brought into direct contact with materials to be rolled, has a uniform cast structure and excellent wear resistance, resistance to surface roughening and crack resistance. To meet these requirements, it is effective to form the shell portion by a centrifugal casting method, and the production of such compound rolls having shell portions and core portions is widely conducted. In the centrifugal casting method, a melt for a shell portion is usually introduced into a hollow cylindrical mold rotatable around its longitudinal axis at a high speed, and solidified in the mold.

In this case, since the melt is rapidly cooled by contact with an inner surface of the mold usually made of steel, an outer surface of the shell portion of the compound roll has a fine metal structure. Therefore, the shell portion of the compound roll shows excellent wear resistance, resistance to surface toughening and crack resistance. However, as a distance between the inner surface of the mold and the melt to be solidified becomes larger, the cooling speed of the melt for the shell portion decreases, and the temperature gradient of the melt becomes smaller. As a result, the metal structure of the shell portion becomes coarser, so that various properties required for the shell portion such as a wear resistance, etc. are deteriorated. Accordingly, after a long period of time during which machining of the shell portion of the compound roll is repeated, an inner portion of the shell portion is exposed outside, which fails to keep the above excellent properties. To solve this problem, it is considered to be effective that the cooling speed of the melt for the shell portion is increased, and it is necessary to make the cooling speed of the melt as even as possible in any portion along the radial direction of the shell portion.

To increase the cooling speed of the melt for the shell portion, proposals were made to cool the mold by water, and to spray the melt onto an inner surface of the mold (Japanese Patent Laid-Open No. 1-254363). Also, to avoid undesirable segregation and other defects generated in the shell portion and to improve the uniformity of the shell portion, it was proposed to move the point of pouring the melt into the mold in the centrifugal casting method (Japanese Patent Publication No. 50-33021). Further, research has been conducted on the materials for the shell portion. At present, the shell portion produced by the centrifugal casting method is mainly made of a high-alloy cast iron, a high-chromium cast iron, a high-chromium cast steel, etc. Also, recently, a high-speed steel material was proposed to form the shell portion of the compound roll (Japanese Patent Laid-Open No. 60-124407).

Among them, in the case of a roll used for hot rolling or cold rolling, the non-uniformity of the cast metal structure of the shell portion due to the existence of coarse precipitated grains and segregation leads to a poorer wear resistance, resulting in the increase of roll consumption per a unit weight of a material to be rolled and poorer quality of the rolled material.

Since high quality is increasingly required for rolled steel sheets recently, high requirements are imposed on the roll. Therefore, the shell portion of the compound roll is required to have an increasingly finer metal structure with higher uniformity.

In the case of forming the shell portion with the high-speed steel, a surface portion of the shell portion has a fine metal structure by the rapid cooling action of the mold. However, since the rapid cooling action of the mold decreases inside the shell portion, the metal structure becomes coarser. As a result, in the deep area of the shell portion, which is to be exposed by several times of machining, it shows poor resistance to wear and surface roughening.

In the case of forming the shell portion by a centrifugal casting method, there is also a problem that the shell portion inevitably contains cast defects and non-uniformity of the metal structure. Since the cooling speed (temperature gradient) of the shell portion is smaller in the inside than in the surface portion, it is difficult for gas, dissolved elements, impurities, etc. in the melt for the shell portion to escape toward an inside mold cavity into which the melt is poured. Accordingly, these components are trapped in the process of solidifying the melt, resulting in the segregation of carbides, coarse metal structure, gas defects, etc.

OBJECT AND SUMMARY OF THE INVENTION

Accordingly, an object of the present invention is to provide a compound roll having a shell portion having a fine metal structure with excellent uniformity.

Another object of the present invention is to provide a method of producing such a compound roll.

As a result of intense research on the centrifugal casting method in view of the above objects, the inventors have found that by controlling the supply temperature of the melt and the shell portion-forming speed, a large cooling speed and so a large temperature gradient can be achieved in the solidification interface between the melt and the shell portion, thereby preventing the excess growth of the metal structure in the shell portion, which in turn leads to the production of the shell portion free from cast defects.

Thus, the compound roll produced by centrifugal casting according to the present invention comprises a shell portion made of a hard, high-alloy cast steel or iron having excellent wear resistance and resistance to surface roughening and a core portion made of a tough cast iron or steel, the high-alloy cast steel or iron of the shell portion having a composition consisting essentially, by weight ratio, of 1.0–3.0% of C, 2.0% or less of Si, 2.0% or less of Mn, 2.0–15.0% of Cr, 10.0% or less of Mo, 2.0–8.0% of V, the balance being substantially Fe and inevitable impurities, an average diameter of crystal grains constituting a matrix of the shell portion being 100 $\mu$m or less in a range from a surface to a depth of 50 mm when determined by an image analysis method on the crystal grains having diameters exceeding 30 $\mu$m, and the crystal grains satisfying the formula: $m_2 \leq 1.2\, m_1$, wherein $m_1$ is an average diameter of the crystal grains at the surface of the shell portion, and $m_2$ is an average diameter of the crystal grains at the depth of 50 mm.

The method of producing the above compound roll according to the present invention comprises centrifugally casting said shell portion by supplying a melt for the shell portion at a temperature T satisfying the formula: $Tc \leq T \leq Tc+90°$ C., wherein Tc is a primary crystal-forming temperature in the shell portion, to a hollow cylindrical mold rotatable around its longitudinal axis, at such a speed that an average shell portion-forming speed in the mold is 2–40 mm/min.

DETAILED DESCRIPTION OF THE PREFERRED EMBODIMENTS

Figure 1:
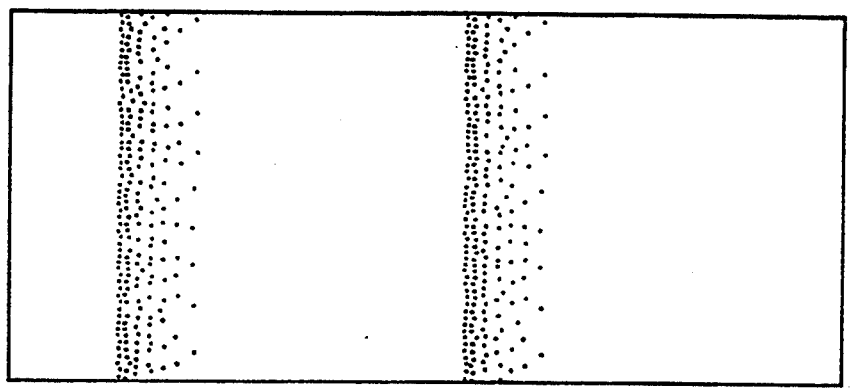
FIG. 1 is a schematic view showing the result of a sulfur print test in Example 1.

[1] Composition of high-alloy cast steel or iron for shell portion

The high-alloy cast steel or iron which may be used for the shell portion of the compound roll according to the present invention has the following composition:

(1) C: 1.0–3.0 weight %

C is an element necessary for forming carbides to increase the wear resistance of the shell portion, but as the amount of C increases, the crack resistance of the shell portion decreases. Accordingly, the amount of C should be within the range of 1.0–3.0 weight %. If the amount of C is less than 1.0 weight %, the resulting shell portion would show a poor wear resistance because of small amounts of carbides precipitated. On the other hand, if the amount of C is more than 3.0 weight %, the resulting shell portion would show poor crack resistance. The preferred amount of C is 1.3–2.0 weight %.

(2) Si: 2.0 weight % or less

Si is an element necessary as a deoxidizer. It is also effectively dissolved in $M_6C$ carbides in place of expensive elements such as W, Mo, etc. thereby reducing the cost of the shell portion. However, if the amount of Si exceeds 2.0 weight %, the resulting shell portion would have cast defects. The preferred amount of Si is 0.3–1.5 weight %.

(3) Mn: 2.0 weight % or less

Mn functions as a deoxidizer and as an element for forming a compound with S as MnS so that the adverse effect of S is eliminated. However, if the amount of Mn exceeds 2.0 weight %, a residual austenite phase is likely to be formed in the resulting shell portion, thereby failing to stably exhibit sufficient hardness. On the other hand, if the amount of Mn is too small, sufficient deoxidizing function cannot be exhibited. The preferred amount of Mn is 0.3–1.5 weight %.

(4) Cr: 2.0–15.0 weight %

If the amount of Cr is less than 2.0 weight %, sufficient hardenability cannot be obtained. On the other hand, if the amount of Cr exceeds 15.0 weight %, excess amounts of chromium carbides ($M_{23}C_6$) are formed. Since $M_{23}C_6$ is softer than MC and $M_2C$, the chromium carbides would reduce the wear resistance of the shell portion. The preferred amount of Cr is 3.0–10.0 weight %.

(5) Mo: 10.0 weight % or less

Mo serves to increase the hardenability and high-temperature strength. However, if the amount of Mo exceeds 10.0 weight %, $M_6C$ and $M_2C$ carbides would increase in the metal structure in balance with C, V and Mo, resulting in a poor toughness and resistance to surface roughening. The preferred amount of Mo is 2.0–8.0 weight %.

(6) V: 2.0–8.0 weight %

V is an element necessary for forming MC carbides to increase the wear resistance of the shell portion. If the amount of V is less than 2.0 weight %, sufficient effect cannot be obtained. On the other hand, if the amount of V exceeds 8.0 weight %, the melt is severely oxidized and so the viscosity of the melt is increased. As a result, a good cast shell portion cannot be produced. The preferred amount of V is 2.0–6.0 weight %.

(7) Optional elements

In addition to the above elements, the high-alloy cast steel or iron for the shell portion may optionally contain W, Ni, Co, and/or N.

(a) W: 20.0 weight % or less

W is an element necessary for maintaining the high-temperature strength. However, if the amount of W exceeds 20.0 weight %, $M_6C$ carbides would increase in the metal structure, resulting in a poor toughness and resistance to surface roughening. The more preferred amount of W is 2.0–15.0 weight %.

(b) Ni: 3.0 weight % or less

Ni is effective to increase the hardenability. Accordingly, Ni may be added in an amount of 3.0 weight % or less. However, if Ni is added excessively, there appears a residual austenite phase in the metal structure of the shell portion, resulting in cracking, and a poor resistance to surface roughening. The more preferred amount of Ni is 0.1–1.5 weight %.

(c) Co: 10.0 weight % or less

Co is dissolved in the matrix and retards the precipitation of carbides, thereby preventing the softening of the matrix. Namely, Co is an element effective for increasing resistance to temper softening and for effecting secondary hardening. However, even if the amount of Co exceeds 10.0 weight %, the cost of the shell portion would be increased without further improvement. The more preferred amount of Co is 1.0–7.0 weight %.

(d) N: 0.03–0.2 weight %

In the high-alloy cast steel or iron used in the present invention, the amount of N is preferably 0.03–0.2 weight %. With this range of N, the tempering hardness is increased. However, if N is added excessively, the shell portion would be brittle. The more preferred amount of N is 0.03–0.1 weight %.

(8) Impurities

The inevitable impurities of the high-alloy cast steel or iron used in the present invention are P and S. To prevent the brittleness of the shell portion, the amount of P should be less than 0.1 weight %, and the amount of S should be less than 0.06 weight %.

[2] Centrifugal casting method

The centrifugal casting method according to the present invention is conducted under the conditions of the controlled supply temperature of the melt for the shell portion and the controlled shell portion-forming speed.

(1) $Tc \leq T \leq Tc+90°$ C.

In the centrifugal casting method, the temperature of the melt for the shell portion measured in a tundish is usually regarded as its casting temperature. However, the actual temperature of the melt in the hollow cylindrical mold is somewhat lower than the temperature of the melt measured in the tundish. To achieve an accurate control of the casting temperature, the temperature of the melt in the hollow cylindrical mold should be determined. Although it is generally difficult to measure the temperature of the melt in the mold, the inventors have found that there is a correlation between the temperature of the melt just discharged from the outlet of the tundish and the temperature of the melt in the mold. This correlation can be determined experimentally depending on the size and shape of the hollow cylindrical mold, pouring speed of the melt and operation conditions, etc. Accordingly, the temperature of the melt just flowing from the outlet of the tundish can be controlled to achieve the most preferred casting temperature.

Defining the temperature of the melt just flowing from the outlet of the tundish (entering into the hollow cylindrical mold) as a supply temperature "T", the supply temperature should meet the requirement: $Tc \leq T \leq Tc+90°$ C., wherein Tc is a primary crystal-forming temperature in the shell portion.

The above supply temperature is lower than the casting temperature in the conventional centrifugal casting method. Accordingly, the austenitic primary crystals start to be formed and the melt starts to be solidified as soon as the melt is introduced into the hollow cylindrical mold.

If the supply temperature T is higher than $Tc+90°$ C., it takes too much time until the melt is solidified in the hollow cylindrical mold, failing to provide a large cooling speed. This leads to the excess growth of the metal structure of the shell portion, resulting in a coarse metal structure (coarse primary crystals). On the other hand, if the supply temperature T is lower than Tc, the melt starts to be solidified in the discharge nozzle of the tundish, failing to the formation of a good shell portion.

Incidentally, the supply temperature T can be determined by subtracting an experimentally obtained parameter (for instance, 10–60° C.) from the temperature of the melt just exiting from the discharge nozzle of the tundish.

(2) Average shell portion-forming speed

The average shell portion-forming speed is defined herein as a value obtained by dividing the total thickness of the shell portion formed by the time consumed. In general, the shell portion-forming speed in a usual centrifugal casting method is set at 50–200 mm/min. in order to make sure that the melt introduced can be uniformly laid on an entire inner surface of the mold. However, such a high shell portion-forming speed leads to a small cooling speed of the melt in the mold, which means that a uniform, fine metal structure cannot be obtained in the shell portion.

In the present invention, the average shell portion-forming speed is set at as small as 2–40 mm/min. to make sure that the melt is supplied onto the surface of the shell portion being formed in the mold at substantially the same speed as the advancing speed of the solidification interface. By controlling the average shell portion-forming speed at this level, a thin melt pool can always be kept inside the shell portion being formed in the mold, and the solidification interface can advance radially inward without disturbance and non-uniformity.

Since the thin melt pool has a small heat capacity, a large cooling speed of the melt pool can be achieved by heat conduction and heat dissipation through the solidified shell portion and the mold. Also, since the melt pool is cooled in the mold from near a primary crystal-forming temperature to a solid-liquid solidification temperature, a large temperature gradient can be obtained. Such large cooling speed and temperature gradient can be achieved inside the thin melt pool by causing the solidification interface to advance in parallel with the axis of the hollow cylindrical mold while keeping uniformity. This contributes to the formation of a uniform and fine metal structure without cast defects. Such effects would not be obtained if the average shell portion-forming speed exceeds 40 mm/min., resulting in a coarse metal structure. On the other hand, if the average shell portion-forming speed is lower than 2 mm/min., the supply of the melt is so insufficient that the supply of the melt pool cannot keep up with the advance of the solidification interface, failing to provide a good shell portion.

Incidentally, in the initial stage of supplying the melt for the shell portion into the mold, the supply speed of the melt may be as high as 50–200 mm/min. because the melt in contact with the inner surface of the mold is rapidly cooled. This initial stage may be conducted generally up to about 40%, preferably up to about 35% of the total thickness of the shell portion. Thereafter, the shell portion-forming speed should be lowered, so that the average shell portion-forming speed becomes 2–40 mm/min.

With respect to the core portion, it should be noted that its materials and production conditions are not restrictive, and that any cast iron and cast steel can be used under known casting conditions as long as high mechanical strength such as bending strength, toughness, etc. can be achieved.

[3] Metal structure of shell portion

The shell portion produced by the above centrifugal casting method has a metal structure in which fine crystal grains are uniformly distributed. The term "crystal grains" used herein means particles or phases primarily precipitated in the solidification of the melt of the shell portion, which mainly consist of austenite. The crystal grains are sometimes called "primary crystals."

In the first aspect of the present invention, the fine crystal grains have an average diameter of 100 $\mu$m or less from a surface to a depth of 50 mm in the shell portion, when only fine crystal grains having diameters exceeding 30 $\mu$m are counted in an image analysis method.

Since the crystal grains are in various shapes in a photomicrograph, their diameters cannot be determined without converting the crystal grains to true circles. Accordingly, they are first converted to true circles having the same areas as those of the crystal grains by an image analysis method, and the diameters of the true circles obtained from the crystal grains are averaged. In this case, only the true circles having diameters exceeding 30 $\mu$m are counted, because calculation would be extremely difficult if those having diameters lower than 30 $\mu$m are included in the calculation of the average diameter.

If the average diameter of the crystal grains calculated by the above method is larger than 100 $\mu$m, the metal structure of the shell portion is too rough, failing to produce high-quality rolled steel sheets.

In the second aspect of the present invention, the average diameter of the crystal grains satisfies the formula: $m_2 \leq 1.2 m_1$, wherein $m_1$ is the average diameter of the crystal grains at the surface of the shell portion, and $m_2$ is the average diameter of the crystal grains at the depth of 50 min. If this relation is not met, the metal structure of the shell portion would be too non-uniform in a radial direction, meaning that the wear resistance and the resistance to surface roughening decrease rapidly by machining the roll surface to remove a surface roughness after a certain period of service. This leads to a high roll cost per a unit amount of rolled steel sheets.

The present invention will be explained in detail by way of the following Examples.

EXAMPLE 1

Comparative Example 1

Using a hollow cylindrical mold having an inner diameter of 420 mm and a roll body length of 1530 mm, 700 kg of a melt having a composition shown in Table 1 was centrifugally cast to provide a sleeve having a thickness of 60 mm.

iron sulfide was added to the melt in the inlet opening of the mold when the thickness of the melt supplied became 10 mm and 40 mm, respectively. The resulting shell portion was cut to obtain test pieces for measuring the metal structure of the shell portion.

FIG. 1 schematically shows the result of the sulfur print test in Example 1. The results of the sulfur print test are shown in Table 2.

TABLE 2

| At Time of Adding Iron Sulfide | | Position of Solidification Interface Measured by Sulfur Print (B) | Thickness of Melt Pool (A-B) | Average Advance Speed of Solidification Interface (B/t) |
| --- | --- | --- | --- | --- |
| Time (t) | T* of Melt (A) | | | |
| 50 sec. | 10 mm | 8 mm | 2 mm | 9.6 mm/min. |
| 3 min. 20 sec. | 40 mm | 33 mm | 7 mm | 9.9 mm/min. |

Note
*Thickness.

As shown in FIG. 1, since the position of the solidification interface of the melt was 8 mm from the inner surface of the mold (outer surface of the shell portion) when the thickness of the melt added was 10 mm, the thickness of the unsolidified melt pool was 2 mm, and the average shell portion-forming speed (average advance speed of the solidification interface) was 9.6 mm/min (0.16 mm/sec.). Also, since the position of the solidification interface of the melt was 33 mm from the inner surface of the mold when the thickness of the melt added was 40 mm, the thickness of the unsolidified melt pool was 7 mm, and the average advance speed of the solidification interface was 9.9 mm/min. (0.17 mm/sec.).

It was then confirmed by the observation of the metal structure of the shell portion that the shell portion had

TABLE 1

| Sample No.(1) | Chemical Composition (weight %) | | | | | | | | | | Ts(2) (°C.) | V$_{av}$(3) (mm/min.) |
| --- | --- | --- | --- | --- | --- | --- | --- | --- | --- | --- | --- | --- |
| | C | Si | Mn | P | S | Ni | Cr | Mo | V | W | | |
| 1 | 1.41 | 0.80 | 0.45 | 0.021 | 0.013 | 0.69 | 6.01 | 1.95 | 2.48 | 3.00 | 1440 | 12 |
| 2 | 1.38 | 0.76 | 0.42 | 0.023 | 0.011 | 0.70 | 5.97 | 1.94 | 2.55 | 2.98 | 1475 | 100 |

Note:
*(1)Sample No. 1: Example 1
Sample No. 2: Comparative Example 1
(2)Supply temperature of the melt.
(3)Average shell portion-forming speed.

In both cases, the inner surface of the mold was coated with a refractory material in a thickness of 2.5 mm, and the rotation speed of the mold was set such that a centrifugal gravity number was 140 G on the surface of the melt being formed into the shell portion in the mold. By conducting a differential thermal analysis, the primary crystal-forming temperature Tc was found to be 1390° C. Accordingly, the supply temperature of the melt was Tc+50° C. in Example 1 and Tc+85° C. in Comparative Example 1. Thus, the casting of the shell portion was completed for 5 minutes. The average shell portion-forming speed was about 12 mm/min.

In the method of Example 1, to measure the advance speed of the solidification interface of the melt, 200 g of a fine and uniform matrix structure from a surface area to a depth of 50 mm.

EXAMPLE 2

Comparative Example 2

Using a hollow cylindrical mold having an inner diameter of 1130 mm and a roll body length of 1593 mm, a melt having a composition shown in Table 3 was centrifugally cast in the same manner as in Example 1 to provide a sleeve having a thickness of 100 mm.

TABLE 3

| Sample No.(1) | Chemical Composition (weight %) | | | | | | | | | | Ts(2) (°C.) | V$_{av}$(3) (mm/min.) |
| --- | --- | --- | --- | --- | --- | --- | --- | --- | --- | --- | --- | --- |
| | C | Si | Mn | P | S | Ni | Cr | Mo | V | W | | |
| 3 | 1.85 | 0.80 | 0.70 | 0.024 | 0.009 | 1.08 | 4.14 | 5.71 | 4.27 | 2.93 | 1385 | 15 |
| 4 | 1.84 | 0.85 | 0.67 | 0.026 | 0.011 | 0.99 | 4.25 | 5.97 | 4.31 | 3.00 | 1420 | 100 |

Note:
*(1)Sample No. 3: Example 2
Sample No. 4: Comparative Example 2
(2)Supply temperature of the melt.
(3)Average shell portion-forming speed.

In both cases, the inner surface of the mold was coated with a refractory material in a thickness of 2.0 mm, and the rotation speed of the mold was set such that a centrifugal gravity number was 120 G on the surface of the melt being formed into the shell portion in the mold. The primary crystal-forming temperature Tc was 1335° C. Accordingly, the supply temperature of the melt was Tc+50° C. in Sample No. 3 (Example 2), Tc+85° C. in Sample No. 4 (Comparative Example 2).

Incidentally, the initial supply speed of the melt (corresponding to about 30% of the total amount the melt supplied) was made high, and the supply speed of the remaining melt was made low. Namely, in the shell portion having a total thickness of 100 mm, the initially cast (outer) portion of the shell portion having a thickness of 30 mm was formed at a supply speed of 120 mm/min., and the later cast (inner) portion of the shell portion having a thickness of 70 mm was formed at a supply speed of 11 mm/min. in Example 2. Thus, the casting of the shell portion was completed for 6 minutes 37 seconds, and the average shell portion-forming speed was about 15 mm/min. in Example 2.

In the same manner as in Example 1, each of the resulting shell portions was machined to obtain test pieces for measuring the metal structure thereof. Also, after eliminating the surface machining allowance of the as-cast products by machining, the entire roll body (length: 1530 mm) of each compound roll was machined at a depth of 25 mm and 50 mm, respectively from a surface to investigate the cast defects and segregation by an ultrasonic testing method, by observation by the naked eye, and by macro-etching.

Figure 2A:
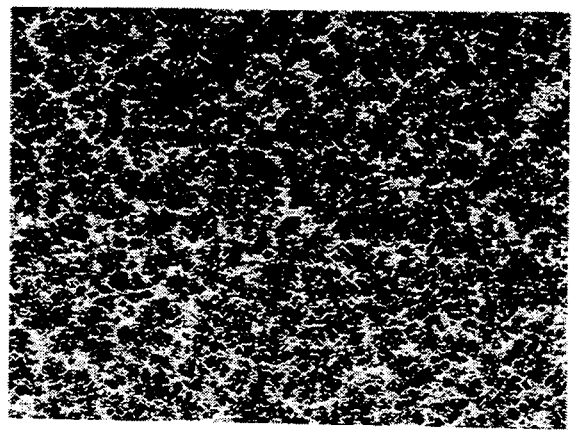
FIG. 2(a) is a photomicrograph showing the metal structure of the shell portion at a surface in Example 2.
Figure 2B:
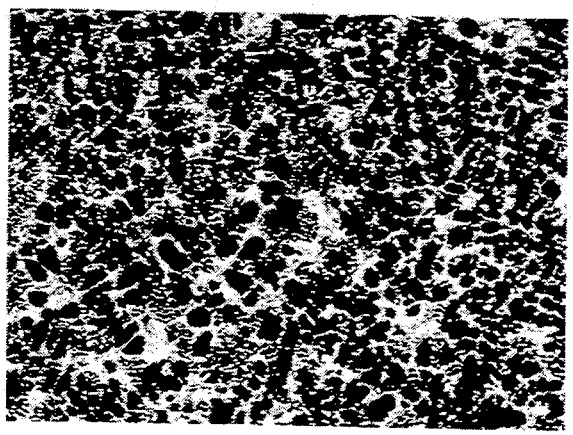
FIG. 2(b) is a photomicrograph showing the metal structure of the shell portion at a depth of 50 mm from the surface in Example 2.
Figure 3A:
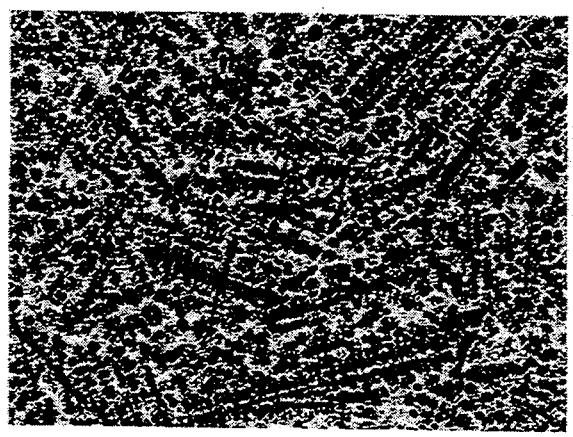
FIG. 3(a) is a photomicrograph showing the metal structure of the shell portion at a surface in Comparative Example 2.
Figure 3B:
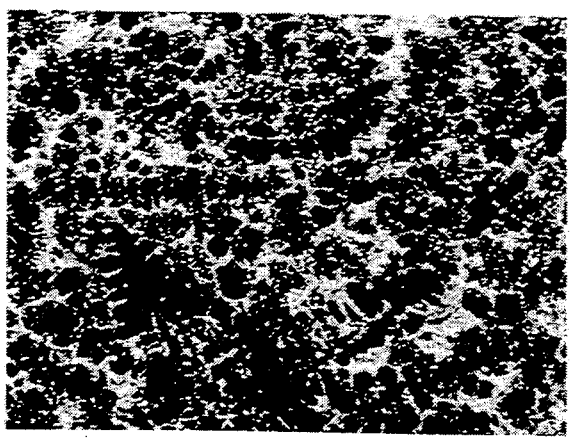
FIG. 3(b) is a photomicrograph showing the metal structure of the shell portion at a depth of 50 mm from the surface in Comparative Example 2.

FIGS. 2(a) and 2(b) are photomicrographs showing the metal structure of the shell portion in a surface portion and in a deep portion (50 mm from the surface) in Example 2, and FIGS. 3(a) and 3(b) are photomicrographs showing the metal structure of the shell portion in a surface portion and in a deep portion (50 mm from the surface) in Comparative Example 2. In these photomicrographs, areas in a black color are a matrix structure (primary crystal structure), and those in a white color are carbide particles.

The metal structure of the shell portion in a surface portion and a deep portion (50 mm from the surface) in each compound roll of Example 2 and Comparative Example 2 was quantitatively measured by an image analysis method. In the measurement, crystal grains having various shapes were first converted to true circles having the same areas in the photomicrograph as those of the crystal grains, and only the true circles having diameters exceeding 30 μm were counted for obtaining the average diameter of the crystal grains. For the measurement of the matrix structure, the surface of the test piece to be measured was subjected to heavy etching so that the matrix particles (primary crystals) were turned to black, and the same measurement was repeated on 20 fields in the photomicrograph. An average value of the measured results was used as an average diameter of the matrix particles.

As a result, in Comparative Example 2, the matrix structure (crystal grains) had an average diameter of 83 μm in a surface portion and 113 μm in a portion as deep as 50 mm from the surface. On the other hand, in Example 2, the matrix structure (crystal grains) had an average diameter of 75 μm and 88 μm, respectively, in a surface portion and in a portion as deep as 50 mm from the surface.

It is clear from the above results, in the shell portion of the compound roll according to the present invention, the shell portion is formed by a fine and uniform metal structure from a surface to a deep portion.

As a result of ultrasonic testing, no cast defects were observed in Examples 2 and Comparative Example 2. After eliminating the surface machining allowance of the as-cast products, the shell portion was machined repeatedly by 5 mm in a radial direction to observe the metal structure of the inside portion of the shell portion. The segregation of carbide (1 mm in diameter) was observed by the naked eye not only at one point at the depth of 25 mm but also at one point at the depth of 50 mm in the shell portion produced in Comparative Example 2.

As a result of observation by the naked eye and macro-etching, it was confirmed that there was a non-uniformity of the metal structure (segregation) in an entire area at a depth exceeding 25 mm in the shell portion of Comparative Example 2. On the other hand, in Example 2, cast defects and segregation were not observed in the shell portion by the naked eye and by macro-etching.

As described above, the compound roll of the present invention comprises a shell portion having a fine and uniform metal structure free from cast defects, segregation, etc. Therefore, it can be used for producing high-quality rolled steel sheets by hot rolling or cold rolling, and the amounts of the rolled steel sheets per a unit consumption of the shell portion of the compound roll can be increased.

What is claimed is:

1. A method of producing a compound roll comprising a shell portion made of a hard, high-alloy cast steel or iron having excellent wear resistance and resistance to surface roughening and a core portion made of a tough cast iron or steel, said high-alloy cast steel or iron of said shell portion having a composition consisting essentially, by weight, of 1.0–3.0% of C, 2.0% or less of Si, 2.0% or less of Mn, 2.0–15.0% of Cr, 10.0% or less of Mo, 2.0–8.0% of V, the balance being substantially Fe and inevitable impurities, an average diameter of crystal grains constituting a matrix of the metal structure of said shell portion being 100 μm or less in a range from a surface to a depth of 50 mm when determined by an image analysis method on the crystal grains having diameters exceeding 30 μm, and said crystal grains satisfying the formula: $m_2 \leq 1.2\, m_1$, wherein $m_1$ is an average diameter of said crystal grains at the surface of said shell portion, and $m_2$ is an average diameter of said crystal grains at the depth of 50 mm, said method comprising centrifugally casting said shell portion by supplying a melt for said shell portion at a temperature T satisfying the formula: $Tc \leq T \leq Tc + 90°$ C., wherein Tc is a primary crystal-forming temperature of the melt for said shell portion, to a hollow cylindrical mold rotatable around its longitudinal axis, at such a speed that an average shell portion-forming speed in said mold is 2–40 mm/min.

2. The method according to claim 1, wherein said melt for said shell portion is supplied to said hollow cylindrical mold in two stages comprising a first stage wherein said melt is supplied to said hollow cylindrical mold at such a speed that said average shell portion-forming speed is 50–200 mm/min. until up to about 40% of the total thickness of said shell portion is formed, and a second stage wherein said melt is supplied to said hollow cylindrical mold at such a speed that said average shell portion-forming speed is 2–40 mm/min. until the formation of the remaining portion of said shell portion is completed.

3. The method according to claim 1, wherein said high-alloy cast steel or iron of said shell portion further contains 20.0 weight % or less of W.

4. The method according to claim 1, wherein said high-alloy cast steel or iron of said shell portion further contains 3.0 weight % or less of Ni.

5. The method according to claim 1, wherein said high-alloy cast steel or iron of said shell portion further contains 10.0 weight % or less of Co.

6. The method according to claim 1, wherein said high-alloy cast steel or iron of said shell portion further contains 0.03–0.2 weight % of N.

7. The method according to claim 2, wherein said high-alloy cast steel or iron of said shell portion further contains 20.0 weight % or less of W.

8. The method according to claim 2, wherein said high-alloy cast steel or iron of said shell portion further contains 3.0 weight % or less of Ni.

9. The method according to claim 2, wherein said high-alloy cast steel or iron of said shell portion further contains 10.0 weight % or less of Co.

10. The method according to claim 2, wherein said high-alloy cast steel or iron of said shell portion further contains 0.03–0.2 weight % of N.

* * * * *